United States Patent Office 3,471,169
Patented Oct. 7, 1969

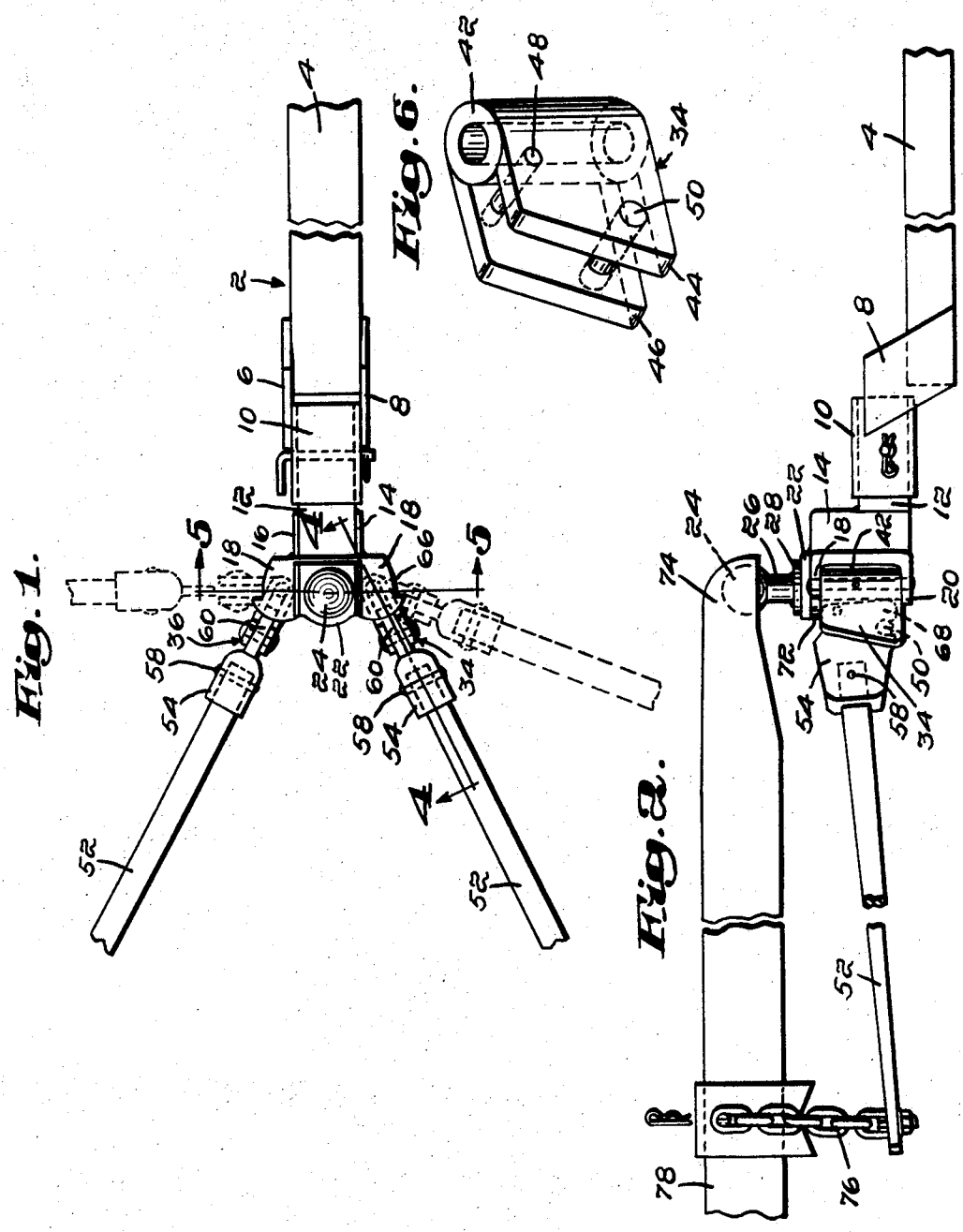

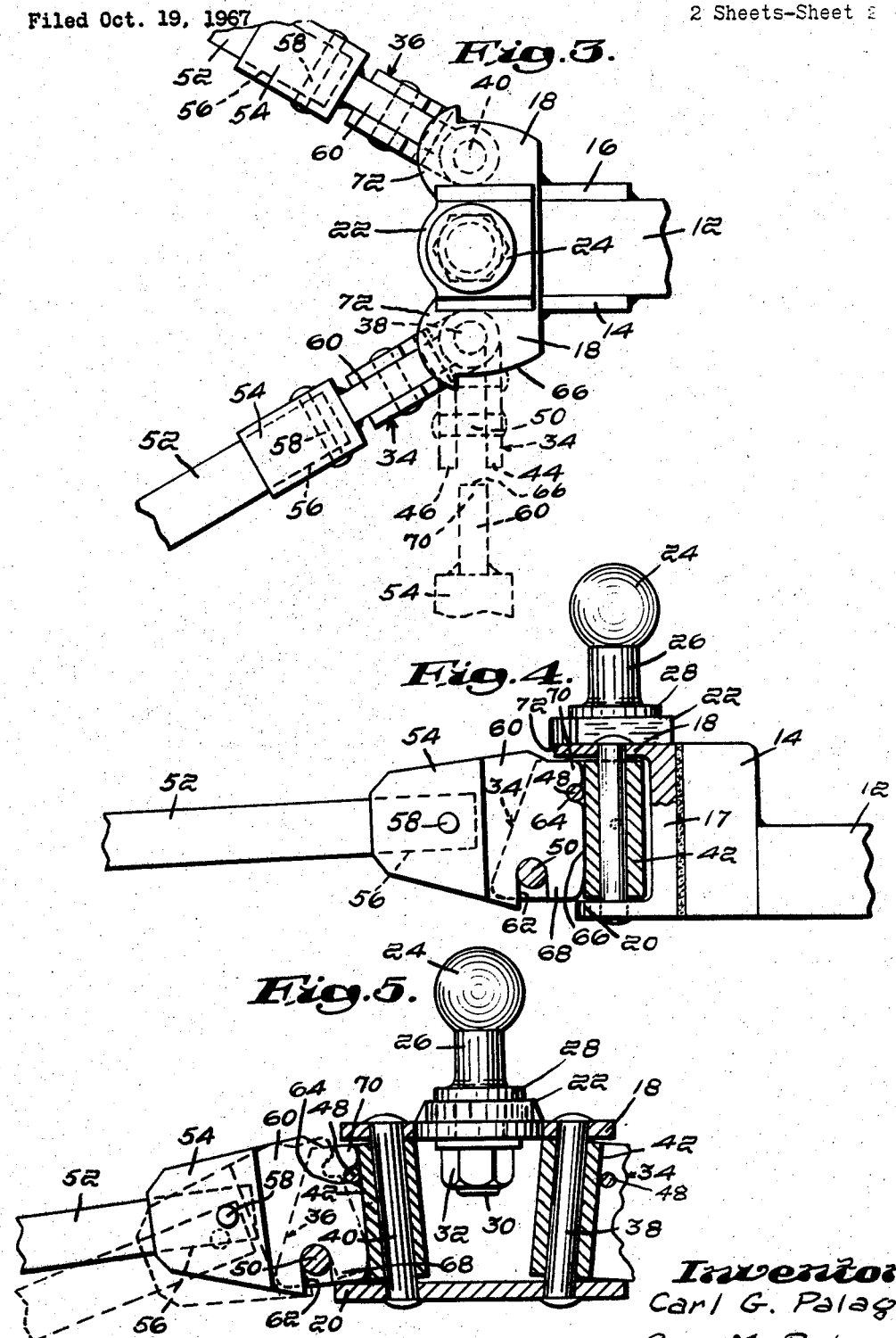

3,471,169
LOAD EQUALIZING HITCH
Carl G. Palage, 8 Maple Road, Winchester, Mass. 01890, and Guy M. Palage, 78 Arlington Road, Woburn, Mass. 01801
Filed Oct. 19, 1967, Ser. No. 676,559
Int. Cl. B60d 1/14, 1/16
U.S. Cl. 280—406          6 Claims

ABSTRACT OF THE DISCLOSURE

The load equalizing hitch for a ball and socket type coupling between an automobile and a trailer tongue and having a pair of spring bars individually detachably connectible with the ball mount carried by the automobile. The ball mount has a pair of vertically pivoted U-shaped members with which the forward ends of the respective spring bars can be connected, but only when the respective bars are in a position substantially parallel to the bumper. After connection, swinging of the bar assemblies rearwardly about the vertical pivots of said members to their operative positions adjacent the trailer tongue serves to place the connected parts under an overhanging plate fixed to the ball mount which plate precludes removal of the spring bars.

Background of the invention

Load equalizing hitches are now well known in the automotive field. The following patents are illustrative of the general principles involved: Mathisen, Nos. 2,597,657 and 2,817,541; Reese, No. 2,952,475; and Bock, No. 3,151,879.

In the constructions of the prior art as illustrated in the above referred to patents, it will be observed that provision is made for removal of the spring bars when the trailer is not being towed by the automobile. This is necessary since it is now required by law in most states that when the trailer is not being towed, the ball mount assembly must be removed from the rear of the car if it wholly or even partially obscures the rear license plate.

The spring bar constructions now known to the prior art that can be connected to and disconnected from the ball mount in general function satisfactorily. Difficulties have, however, been encountered in the mechanisms by which the spring bars are initially connected to the ball mount and held in place prior to final connection with the trailer. Some of the prior constructions involve movable latching means which are inherently weak and subject to wear. Others are awkward to manipulate, and women particularly have at times found difficulty in installing and removing the spring bars.

The present invention overcomes these deficiencies.

Summary of the invention

In the present invention, each of the two spring bars is a unitary structure having no moving parts. The ball mount to which the spring bars are connected, has associated therewith a heavy vertically pivoted U-shaped member with which the spring bar can be connected only when the bar is in a position substantially parallel to the car bumper. After connection of the spring bar with the U-shaped member has been made, the connected parts are swung to the rear into a position in which there is a rearwardly extending overhanging plate which precludes removal of the spring bar without affecting in any way its normal operating association with the frame of the trailer.

Brief description of the drawings

FIG. 1 is a plan view of the spring bars connected to the ball mount in operating position.

FIG. 2 is a side elevation showing the tow bar unit that is connected to the automobile, the ball mount with the trailer connecting element in place thereon, and the spring bars in operating position with their afterends connected in normal manner with the trailer frame.

FIG. 3 is an enlarged plan view of a portion of FIG. 1.

FIG. 4 is an enlarged vertical section taken on line 4—4 of FIG. 1.

FIG. 5 is an enlarged vertical section taken on line 5—5 of FIG. 1.

FIG. 6 is a perspective view of the pivoted U-shaped member with which the spring bar makes connection.

Description of the preferred embodiment

Referring first to FIGS. 1 and 2, there is shown at the right the tow bar unit generally referred to at 2, which unit is secured in conventional manner to the frame of the towing automobile. This tow bar unit may be referred to as the first connecting element and comprises a tubular drawbar 4 to which are welded upwardly extending diagonal sideplates 6 and 8. These sideplates have in turn welded therebetween a generally square tube 10 of such size as to receive therein a portion of the ball mount in the form of a solid bar 12. On this solid bar is mounted the rest of the ball hitch which consists of a pair of sideplates 14 and 16 to which is welded a C-shaped member 17 having a top plate 18 and a bottom plate 20.

A boss 22 is welded in central position on top plate 18. Mounted on the boss and top plate 18 is the ball member 24 carried by a heavy vertical stem 26, flanged at 28, permitting it to be secured in position by its lower threaded end 30 and nut 32.

Between the top and bottom plates 18 and 20, and located on either side of the nut 32 are a pair of U-shaped members 34 and 36. These units are identical, so a description of one will suffice to describe the other. The U-shaped members are pivotally mounted between the two plates by means of pivots 38 and 40. These pivots pass through the tubular bearing portion 42 (see FIG. 6) so that they are accurately located. As can be seen in FIG. 5, the pivots are not vertical but instead slope toward each other in a downward direction. This angularity of the pivots causes the spring bars to swing in non-horizontal planes as the automobile may turn in relation to the trailer. This has a desirable and well known effect in improving the stability of the trailer and minimizing fishtailing.

As can be seen in FIG. 6, the U-shaped member 36 has parallel rearwardly extending ears 44 and 46. Extending between the ears and at the upper part thereof is a locating pin 48 close to the bearing 42. At the bottom of the ears and a distance from the bearing 42 is a strong transversely extending member capable of resisting shear and preferably in the form of a heavy connecting pin 50.

The U-shaped members are free to swing about the pivots 38 and 40. When they are swung to a position parallel to the bumper of the car, the ears will be substantially vertical; when they are swung to the rear, the ears will be somewhat tilted as shown in FIG. 5.

The spring bars which are designed to make connection with the U-shaped members are best shown in FIGS. 3 and 4. The main part of the bar 52 is of conventional configuration, namely, long enough to be capable of flexing as the car and trailer go out of longitudinal alignment as in going around a turn, or when the rear wheels of the car are momentarily in a dip in the road. The rear end of the spring bar 52 is arranged to be connected by a tension chain to the trailer frame when in operating position.

The forward end of spring bar 52 is rigidly and permanently connected to spring bar connecting member 54 which has therein a socket 56 in which the end of spring bar 52 resides. The two parts are held in fixed position by pin 58.

The terminal forward end of the spring bar unit consists of a heavy plate 60 welded to connecting member 54. Plate 60 is notched at its bottom at 62 and at its forward side at 64. The vertical surface 66, as can be seen in FIG. 4, makes engagement with the tubular bearing 42 when plate 60 has been inserted in proper position between the ears 44 and 46 of the U-shaped member 36.

In order for plate 60 to be inserted into locked position in the U-shaped member, the following procedure must be followed: the U-shaped member 34 or 36 must be swung to a position substantially parallel to the car bumper, as shown in dotted lines in FIGS. 3 and 5. When in this position, it will be noted that immediately above the space between the ears 44 and 46 a portion of the top plate 18 has been cut away as at 66. This permits the notch 62 of plate 60 to be dropped over pin 50 with the depending hook portion 68 entering the space between bearing 42 and pin 50. The spring bar 52 which at the time of making this connection extends downwardly somewhat is then raised to approximately horizontal position with the locating pin 48 entering notch 64 and the vertical surface 66 of plate 60 coming into engagement with the vertical surface of bearing 42. While holding the spring bar 52 horizontally so that plate 60 remains in the position just described, the spring bar is then swung to a position toward the rear away from the automobile as shown in the solid line position in FIG. 3. In this position, the upper end corner 70 of plate 60 is then in a position under that part of plate 18 indicated at 72 in FIGS. 3 and 4. This part 72 of the plate 18 which has not been cut away extends outwardly far enough so that when spring bar 52 is released from the hand of the installer, it cannot fall downwardly because the top surface of corner 70, pivoting about pin 50 as a center, engages the underside of portion 72 of plate 18.

Thus, so long as the vertical plate 60 is in a position below the uncutaway portion 72 of plate 18, the spring bar is compelled to remain in substantially horizontal position and may be swung horizontally through a substantial angle without any possibility of disconnection. Spring bar 52 can only be disconnected from the U-shaped member 36 when it has been swung to a position substantially parallel with the car bumper as shown in the dotted lines at the bottom of FIG. 3 and as in FIG. 5.

From the foregoing description, it will be appreciated that since no moving parts or latches are needed to hold the spring bar 52 horizontally prior to the tension chain connection of the rear end thereof with the A frame of the trailer, a construction has been provided which will have long life and simplicity of operation.

The other spring bar 52 is then connected to the other U-shaped member 34 or 36 as the case may be in the same manner and both spring bars are then swung to and allowed to remain in the solid line position shown in FIGS. 1, 2, 3 and 4.

The forward end of the A frame of the trailer, which constitutes a second connecting element 74, is then placed on ball member 24 and secured thereto in the usual manner. The ball hitch is then jacked up several inches bringing the rear ends of spring bars 52 close to the trailer frame. The rear ends of spring bars 52 are then connected by the chains 76 to the respective sides 78 of the trailer A frame in conventional manner. When the jack is removed allowing the ball connection to drop, an upward bending force is applied to the spring bars 52 which is adequately resisted by pin 50 and the engagement of surface 66 of plate 60 with the inner face of tubular bearing members 42 which are maintained in fixed position by the pins 38 and 40 with respect to the tow bar unit.

By this construction, the downward load of the front end of the trailer frame is transferred to all four wheels of the towing automobile. The mechanics of this distribution of the load need not be explained herein as it is well understood in the art.

In summary, the invention herein disclosed and claimed does not involve any new principle of operation in connection with trailer load equalizing hitches. It is instead directed to a sturdy construction permitting easy attachment of the spring bars to the automobile when the trailer is about to be connected thereto and correspondingly easy removal of the spring bars from the tow bar unit when the trailer has been disconnected. Once the bars have initially been connected to the tow bar unit and swung to rear position prior to the attachment of the trailer, the spring bars remain in the required generally horizontal position until the final connection of the ends of the spring bars is made with the trailer frame.

It is intended to cover all changes and modifications of the examples of the invention herein chosen for purposes of the disclosure which do not constitute departures from the spirit and scope of the invention.

We claim:

1. In combination with a tow-bar unit adapted to be affixed to a towing automobile and the spring bar of a load equalizer device adapted to be secured to a trailer, means for connecting and disconnecting said spring bar at one end with said tow-bar unit, said means comprising two U-shaped members each fixed in generally vertical pivoted relation to and spaced laterally from each other on said tow-bar unit, a pin extending horizontally across the lower part of the bight of each said U-shaped member, a horizontal plate fixed to said tow-bar unit and covering at least part of the upper end of each said bight, said plate cut away for a limited distance at the opposite lateral sides thereof to expose more of the upper end of each said bight, each said spring bar having means on one end for connection with said U-shaped member, said connection means including a depending hook, a generally vertical wall extending upwardly from the outer end of said hook, and a generally horizontal surface above said hook intersecting said vertical wall, the distance from the upper interior surface of said hook to the intersection of said vertical wall and horizontal surface being greater than the minimum distance from said pin to the underside of the uncutaway part of said plate, whereby each said spring bar can be connected to one of said U-shaped members by placing said hook on said pin when said U-shaped member is substantially at right angles to the long axis of said automobile and the said bight is at the cutaway part of said horizontal plate and then swinging the bar upwardly to horizontal position in which the said vertical wall engages the back of the said bight and whereby said bar will be prevented from pivoting downwardly about said pin when swung to a position toward said trailer so that the intersection of said vertical wall and horizontal surface is under said plate, and means for connecting the other end of said spring bar to said trailer frame.

2. In combination with a tow-bar unit adapted to be affixed to a towing automobile and the spring bar of a load equalizer device adapted to be secured to a trailer, means for connecting and disconnecting said spring bar at one end with said tow-bar unit, said means comprising a vertical plate extending from one end of the spring bar, a pair of substantially parallel vertical ears mounted on a generally vertical pivot on the tow-bar unit and spaced to receive said plate, a downwardly extending hook at the end of said plate, a hook engaging member extending between said ears behind which said hook may be positioned, and a cover plate integral with said tow-bar unit which at least partially covers in a radial direction the space between said ears only when the pivoted ears are in a position extending away from the rear of said towing automobile, whereby when said ears extend crosswise of the towing automobile said spring bar plate may be placed between said ears with the hook behind said hook engaging member and swung upwardly to horizontal position, said spring bar thereafter adapted to be swung in a horizontal plane until extending away from the rear of said automobile in which position the said overhanging cover plate with the spring bar plate thereunder will prevent downward turning movement of said spring bar.

3. The combination set forth in claim 2 in which a locating pin extends between said ears and said spring bar plate has a corresponding notch therein to receive said locating pin to limit vertical movement of said spring bar plate with respect to said vertical ears when said pin is in said notch.

4. The combination set forth in claim 1 in which the pivots of the U-shaped members converge toward each other in a downward direction.

5. The combination set forth in claim 1 in which the said horizontal plate that covers the upper ends of the bights of said U-shaped members has mounted thereon a ball member.

6. The combination set forth in claim 1 in which said spring bar comprises an elongated flexible portion, a body member with a socket therein to receive the forward end of said flexible portion and a vertical plate extending from said body member from which depends said hook and which plate includes said wall and surface.

References Cited

UNITED STATES PATENTS

| | | | |
|---|---|---|---|
| 2,817,541 | 12/1957 | Mathisen | 280—406 |
| 2,952,475 | 9/1960 | Reese | 280—406 |
| 3,151,879 | 10/1964 | Bock | 280—406 |
| 3,185,499 | 5/1965 | Reese | 280—406 |
| 3,206,224 | 9/1965 | Bock et al. | 280—406 |

LEO FRIAGLIA, Primary Examiner